United States Patent
Olsen et al.

(10) Patent No.: US 9,606,705 B2
(45) Date of Patent: Mar. 28, 2017

(54) TECHNIQUES FOR CAPTURING AND DISPLAYING USER INTERACTION DATA

(71) Applicant: Apple Inc., Cupertino, CA (US)

(72) Inventors: Reed E. Olsen, San Jose, CA (US); David A. den Boer, Morgan Hill, CA (US); John G. Slagle, San Marcos, CA (US)

(73) Assignee: APPLE INC., Cupertino, CA (US)

( * ) Notice: Subject to any disclaimer, the term of this patent is extended or adjusted under 35 U.S.C. 154(b) by 355 days.

(21) Appl. No.: 13/706,297

(22) Filed: Dec. 5, 2012

(65) Prior Publication Data

US 2014/0068498 A1 Mar. 6, 2014

Related U.S. Application Data

(60) Provisional application No. 61/697,767, filed on Sep. 6, 2012.

(51) Int. Cl.
G06F 3/0484 (2013.01)
G06F 3/0488 (2013.01)
G06F 11/32 (2006.01)
G06F 11/34 (2006.01)

(52) U.S. Cl.
CPC ........ G06F 3/0484 (2013.01); G06F 3/04883 (2013.01); G06F 11/32 (2013.01); G06F 11/3438 (2013.01); G06F 11/3476 (2013.01); G06F 2201/86 (2013.01)

(58) Field of Classification Search
CPC ............. G06F 11/3438; G06F 11/3476; G06F 2201/86
See application file for complete search history.

(56) References Cited

U.S. PATENT DOCUMENTS

| | | | |
|---|---|---|---|
| 5,577,188 A * | 11/1996 | Zhu | 715/745 |
| 6,608,615 B1 * | 8/2003 | Martins | 345/156 |
| 8,379,053 B1 * | 2/2013 | Phillips et al. | 345/619 |
| 8,487,959 B1 * | 7/2013 | Khan et al. | 345/619 |
| 2005/0216844 A1 * | 9/2005 | Error et al. | 715/745 |
| 2008/0007555 A1 * | 1/2008 | Vrba et al. | 345/440 |
| 2008/0228910 A1 * | 9/2008 | Petri | 709/224 |
| 2009/0122018 A1 | 5/2009 | Vymenets et al. | |
| 2010/0169792 A1 * | 7/2010 | Ascar | G06F 11/3414 715/744 |

(Continued)

FOREIGN PATENT DOCUMENTS

WO    2007113573 A2    10/2007

*Primary Examiner* — Jordany Nunez
*Assistant Examiner* — Mahelet Shiberou
(74) *Attorney, Agent, or Firm* — Morgan, Lewis & Bockius LLP

(57) ABSTRACT

User interface ("UI") event data, including successful and unsuccessful touches, is accumulated and stored in a database. The data that is stored in the database typically includes the location on the display that the touch occurred and the application page with which the user was interacting. Subsequently, an analyst can query the database to determine a suitable data set for analysis. For a given application page, some sort of representation of the spatial distribution of previously logged UI events is generated and displayed. The spatial distribution representation can, for example, be a heat map, where regions having different densities of events are shaded with different colors.

18 Claims, 8 Drawing Sheets

(56) References Cited

U.S. PATENT DOCUMENTS

| | | |
|---|---|---|
| 2010/0251128 A1* | 9/2010 | Cordasco ............ G06F 11/3409 |
| | | 715/736 |
| 2011/0164058 A1* | 7/2011 | Lemay ......................... 345/651 |
| 2012/0022951 A1 | 1/2012 | Tolompoiko et al. |
| 2012/0023402 A1* | 1/2012 | Cifra et al. ................... 715/704 |
| 2012/0151329 A1* | 6/2012 | Cordasco ............ G06F 11/3006 |
| | | 715/234 |
| 2013/0091417 A1 | 4/2013 | Cordasco |
| 2013/0287283 A1* | 10/2013 | Kamath et al. ............... 382/133 |
| 2013/0290225 A1* | 10/2013 | Kamath et al. ................. 706/12 |
| 2013/0290450 A1* | 10/2013 | Butler et al. ................. 709/206 |

\* cited by examiner

TECHNIQUES FOR CAPTURING AND DISPLAYING USER INTERACTION DATA

CROSS REFERENCE TO RELATED APPLICATIONS

This application is a non-provisional, claiming benefit under 35 U.S.C. §119(e), of U.S. Patent Application No. 61/697,767 filed Sep. 6, 2012 for "Techniques for Capturing and Displaying User Interaction Data" (inventors Reed E. Olsen, David A. den Boer, and John G. Slagle). The entire disclosure of the above mentioned application is incorporated by reference for all purposes.

TABLE OF CONTENTS

Cross Reference to Related Applications
Background of the Invention
Summary of the Invention
Brief Description of the Drawings
Description of Specific Embodiments
  Overview
    General Features of Application Environment
    Representative System for Providing User Interaction Data
  Displaying Spatial Distribution of Previously Logged User Interface Events
    Schematic View
    Pictorial and/or Mocked-Up Views
  Invoking Tool for Displaying Spatial Distribution of User Interface Events
    Schematic View
    Pictorial and/or Mocked-Up Views
  Representative Computer Hardware
    Storage Subsystem
    I/O Interface
    User Input and Output Devices
  Conclusion
What is Claimed is:
Abstract of the Disclosure

BACKGROUND OF THE INVENTION

The present invention relates generally to graphical user interfaces, and more specifically to techniques for analyzing users' interactions with applications having such interfaces.

In 2011, Apple Inc. introduced "Smart Signs" into their retail stores. A Smart Sign is a tablet device used to replace the paper signs that would normally provide information regarding displayed products. In the specific implementation, the Smart Signs are tablet devices marketed by Apple under the iPad trademark. The application that runs on the Smart Sign tablets resembles in many ways a web browser in that a user (typically the customer in the retail context) interacts with the application by selecting various screen elements ("interactive objects" or "active objects"). The application that runs on the iPad to provide product information is sometimes referred to as the Smart Sign application.

The various regions of the display (often referred to as screen elements, screen objects, or simply objects) can be active, or they can be inactive. The term "object" often refers to a delineated region of the screen that sets it off from other regions. Objects are often displayed against a background, which users typically interpret as inactive, while it is not always self-evident from mere viewing whether objects defined by delineated regions set against the background are active or inactive.

When the user interacts with an active region, the application takes some action that is normally apparent to the user, e.g., changing something on the display. For example, the application can present a tabbed interface along an edge of the screen (i.e., a row of active regions styled to resemble notebook tabs), and when the user selects a tab, the application displays a different page with information suggested by the label on the selected tab. When the user attempts to interact with an inactive region, the application does nothing apparent, or in some applications, may make an unfriendly sound indicating that the application is not going to do anything that the user might have desired.

The iPad device incorporates a touchscreen, and the user interacts with screen objects by various touch interactions. The touch interactions can include, for example, a single tap, a double tap, a swipe, a long press, a multi-finger tap, or a multi-finger swipe. U.S. Patent Publication No. 2006/0026535 of Hotelling et al. for "Mode-Based Graphical User Interfaces for Touch Sensitive Input Devices" describes technology for interpreting different touch types. The entire disclosure of that patent publication is incorporated by reference.

A typical application in which embodiments of the present invention can be implemented, such as the Smart Sign application, has the capability of displaying various pages or screens, each of which can have one or more active objects or regions and one or more inactive objects or regions. Typically, a user interface ("UI") event on an active object causes the application to change the attributes of some objects, to switch to displaying a different page, to display one or more elements (e.g., a dialog box or other menu item) superimposed on only a portion of the same page, or to move to a different portion of the same page. The different page can have a different set of active and inactive objects, although some might be the same as some on the other screen.

SUMMARY OF THE INVENTION

Embodiments of the present invention provide techniques that can facilitate usability analysis of an application. For example, it may be that certain users spend much of their time attempting to interact with objects that are inactive screen regions.

In the context of this patent application, reference will be made to a "successful" touch or event and an "unsuccessful" touch or event. A successful event is an interaction that results in an action that ensues as a result of the event. That is, a successful event is an interaction with an active screen object. An unsuccessful event, on the other hand, is an event on an inactive screen region, and results in no apparent action being taken by the application.

In short, all interface events such as touch events, whether or not successful, are captured along with other information, and characteristics of their spatial distributions are analyzed. The term "spatial distribution" is used in this patent application in a broad sense to refer to any characteristic of how the events are distributed in space. Thus it can refer to properties (including statistical quantities) of how the points are distributed geometrically, as well as to properties relating to the number/density of points at any given location.

It is possible for an analyst to examine a single customer session, or to examine an amalgamation of many, perhaps thousands, of customer sessions. If it is discovered, for example, that many touch interactions take place on the inactive screen regions, it may be concluded that those inactive screen regions appear to users as if something should happen when they are touched.

While the particular examples described herein deal with touch interactions on a tablet device, embodiments of the invention can find applicability for a wider range of devices and a wider range of interactions. For example, users may interact with screen objects using a direct pointing device such as a stylus on a touchscreen or an indirect pointing device such as a touchpad, trackball, or mouse.

In a representative environment in which embodiments of the invention may be practiced, user interface ("UI") event data is accumulated, including successful and unsuccessful touches. Typically, information from many users on many computers, distributed across multiple stores and potentially multiple countries, is accumulated and preferably stored in a database. The data that is stored in the database typically includes the location on the display that the touch occurred and the application page with which the user was interacting. The data can also include other quantities such as the touch type, the time of the touch, and the location of the store.

Subsequently, an analyst can query the database to determine a suitable data set for analysis. For a given application page, some sort of representation of the spatial distribution of previously logged user interface events is generated and displayed. The spatial distribution representation can, for example, be a scatter plot or a set of contour lines superimposed on the application screen. In a preferred implementation, the spatial distribution is represented by a heat map, where regions having different densities of events are shaded with different colors. For example, the colors can be, in order of decreasing density: red, orange, yellow, green, blue, and purple.

For at least some embodiments of the present invention, while the spatial distribution information is being displayed, the underlying application remains active. Therefore, the analyst can interact with the application and view spatial distribution information for other pages. In a different mode, embodiments of the present invention allow individual sessions to be played back for the analyst.

An aspect of the invention provides a computer-implemented method of analyzing usage of an application where the application presents a screen display that includes a set of one or more active objects, and in response to users interacting with the active objects, the application switches to present a different screen display that includes a different set of one or more different active objects. In this context "switching to a different screen display" can include is not limited to a totally different screen display, but could include, for example, superimposing one or more elements over the original screen display.

The method comprises: presenting a first screen display that includes a first set of active objects on a display; and displaying, in combination with the first screen display, a first representation of a distribution of a first set of previously logged user interface events generated by one or more users interacting with regions of the first screen display.

In this aspect, the method of can further comprise: in response to a current user interaction with one of the first set of active objects, switching to present a second screen display that includes a second set of active objects; and displaying, in combination with the second screen display, a second representation of a distribution of a second set of previously logged user interface events generated by one or more users interacting with regions of the second screen display.

In this aspect, at least one screen display can include a set of one or more inactive display regions in addition to the corresponding set of active objects, and in response to users interacting with the inactive display regions, the application continues to present the same screen display.

The first screen display can include a first set of one or more inactive display regions in addition to the first set of active objects, in which case, the first set of previously logged user interface events generated by one or more users interacting with inactive display regions of the first screen display includes user interface events representing interaction with active objects, and user interface events representing interaction with inactive screen regions.

Another aspect of the invention provides a computer-implemented method of analyzing usage of an application, wherein the application presents a screen display that includes a set of one or more active objects and one or more inactive regions. In response to users interacting with the active objects, the application switches to present a different screen display that includes a different set of one or more different active objects, and in response to users interacting with inactive regions, the application performs substantially no action. The method comprises: presenting a first screen display that includes a first set of active objects on a display; and displaying, in combination with the first screen display, a first representation of a distribution of a first set of previously logged user interface events generated by one or more users interacting with regions of the first screen display; wherein the logged user interface events include user interface events generated by one or more users interacting with inactive regions of the first screen display.

The method can further comprise: in response to a current user interaction with one of the first set of active objects, switching to present a second screen display that includes a second set of active objects; and displaying, in combination with the second screen display, a second representation of a distribution of a second set of previously logged user interface events generated by one or more users interacting with regions of the second screen display.

Another aspect of the invention provides a computer-implemented method of analyzing usage of an application that displays pages. In this method the computer connects to a database that stores spatial information about previous user interactions with regions of pages displayed by the application. In a first time interval, the computer runs the application to display a first page of the application, and displays, in combination with the display of the first page, distribution characteristics of first database information about previous user interactions with regions of the first page displayed by the application.

In a subsequent time interval, the computer runs the application to display a second page of the application, and display, in combination with the display of the second page, distribution characteristics of second database information about previous user interactions with regions of the second page displayed by the application. For example, the first page can include an active object, and the application can display the second page in response to a user interface event directed to the active object.

In this method, the database can include information generated by user interactions with regions of pages displayed by the application running on a plurality of computers, and the first database information is from user interactions with regions of the first page displayed by the application running on fewer than the plurality of computers.

In different implementations for any of the above, the distribution characteristics or representation can be a heat map superimposed on the relevant screen display, a scatter plot superimposed on the relevant screen display, or a set of contour lines superimposed on the relevant screen display. The heat map or other representation can be displayed in response to the invocation of a UI tool or in response to the a particular user gesture.

Another aspect of the invention provides a computer-implemented method of analyzing usage of an application that displays pages. In this method, the computer connects to a database that stores spatial information about previous user interactions with regions of pages displayed by the application, including user interactions with inactive regions of the pages (step a). The computer retrieves information pertaining to a single user's interactions with regions of pages displayed during a single session (step b). The information includes a sequence of user interactions, with the sequence including at least some interactions that do not specify leaving a current page and some interactions that do specify leaving a current page.

The computer runs the application to display a current page of the application (step c), and the computer sequentially displays, in combination with the display of the current page, indications of interactions, if any, in the sequence that do not specify leaving the current page (step d). The computer, upon encountering an interaction that specifies switching from the current page to a different page, displays an indication of that interaction in combination with displaying the current page (step e), and then the computer runs the application to display the different page (step f). The computer designates the different page as the current page (step g), and the repeats steps (d) through (g) at least once.

The spatial information for a given interaction can include position information and, for some types of interactions, path information, and the indication of an interaction can represent the position information for the interaction and path information, if any, for the interaction.

Other aspects of the invention can provide one or more computers programmed to execute instructions carrying out any of the above methods. Other aspects can provide a computer-readable medium containing program instructions, which when executed by a computer system, cause the computer system to execute any of the above methods.

A further understanding of the nature and advantages of the present invention may be realized by reference to the remaining portions of the specification and the drawings, which are intended to be exemplary and not limiting.

DESCRIPTION OF SPECIFIC EMBODIMENTS

Overview

Embodiments of the invention operate in conjunction with an application with which a user interacts, and provide information that can facilitate analysis of the user interactions. This potentially allows an analyst to determine ways to improve the application and thus the user experience with the application. More particularly, the provided information includes spatial information regarding previously logged UI events. The information can be displayed to give an analyst a view of a single user session or a view amalgamating many (e.g., hundreds or thousands of) user sessions.

General Features of Application Environment

Figure 1:
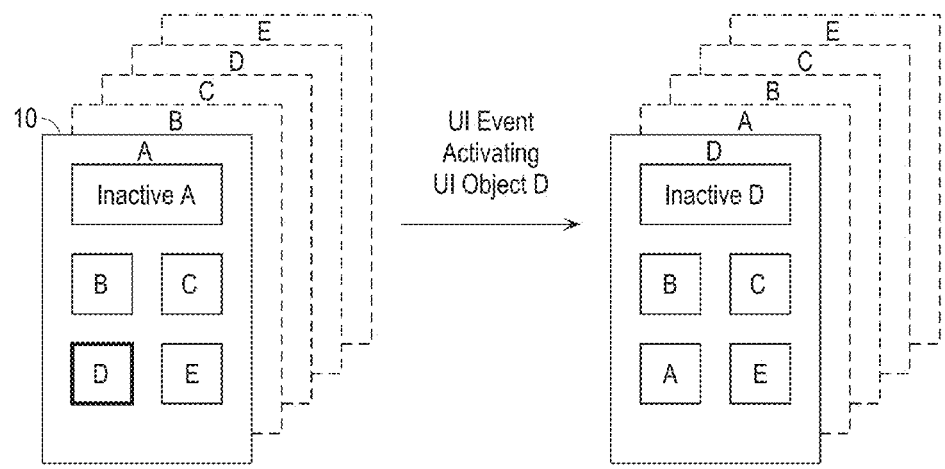
FIG. 1 is a schematic representation of a prior art application showing the way a user interface event on an active object on one application page causes the display to switch to a different page.

FIG. 1 is a schematic representation of a prior art application 10 showing the way a user interface event on an active object on one application page causes the application to display a different page. A representative application is shown as having five pages (also sometimes referred to as sheets or screens), labeled A, B, . . . E. On the left side of the figure, Page A, drawn with a solid outline, is shown as frontmost (signifying that Page A is what is being displayed). The other pages, drawn with dashed outlines, are shown as behind Page A (signifying that they are not being displayed). The frontmost page, Page A, is shown as having an inactive screen region labeled Inactive A, as well as four active screen regions labeled B, C, D, and E. The five delineated regions are shown as set against a background. The four active regions are active regions in that a user interface ("UI") event in one of these regions will result in the application taking an action.

When a UI event occurs in region D, as signified by a heavier outline for region D, the application causes Page D to be displayed and Page A to become hidden. Page D is shown as having an inactive region, labeled Inactive D, as well as active elements B, C, A, and E. Notice that in this example, the displayed pages do not have a user interface object corresponding to that displayed page. For example, if Page A had an object representing a switch to Page A, that object would actually be inactive since Page A would be the screen already being displayed. In a typical tabbed interface, the tab for the active page continues to be displayed, typically with a contrasting appearance. In many examples, the screen region designated "Inactive" might be common across the different pages, but for exemplary purposes, the inactive regions for Pages A and D are labeled differently. For schematic purposes, in views below, successful touch interactions on active object D are also denoted by a heavier outline for object D.

Representative System for Providing User Interaction Data

Figure 2:
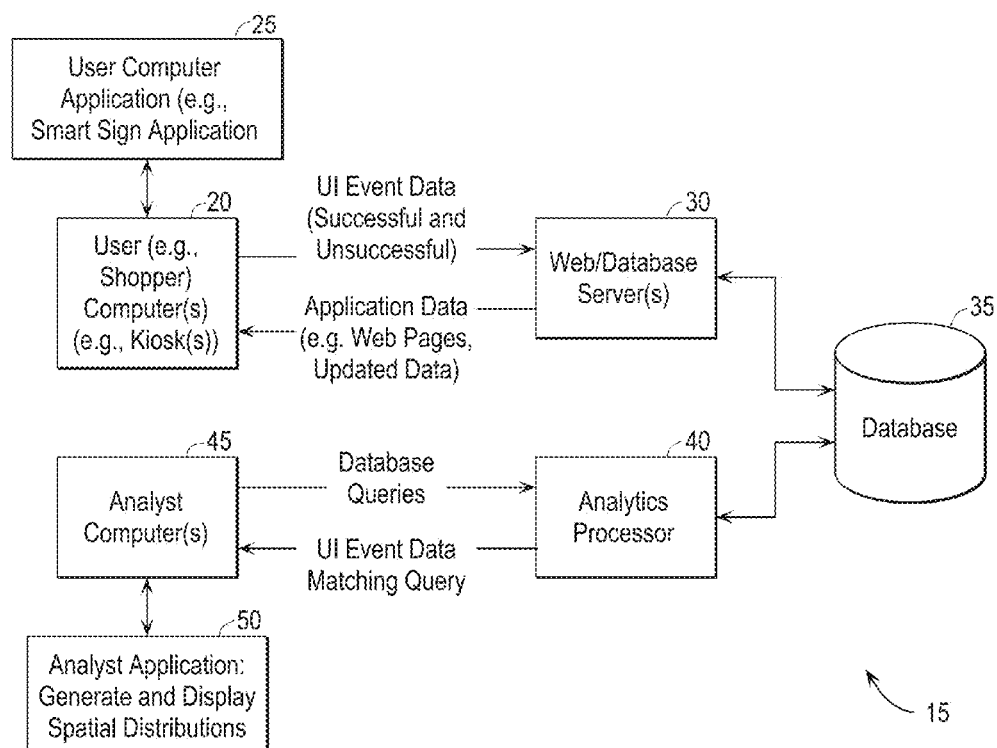
FIG. 2 is a schematic block diagram of a system that can be used to practice of embodiments of the present invention.

FIG. 2 is a schematic block diagram of a system 15 that can be used to practice of embodiments of the present invention. In particular, such a system supports capturing user interaction data representing the user experience with an application, storing such data, analyzing such data, and displaying such data in a manner that an analyst can better understand the nature of such interactions. While the figure shows a particular partitioning of the various system components, it should be understood that various devices could be combined or broken up into multiple devices.

The application that is the subject of the data capture and analysis resides on a user computer 20, such as a public kiosk. In a particular example, the user computer is a tablet device such as an Apple iPad running a Smart Sign application 25 for use as a Smart Sign in a retail establishment. User computer 20 communicates with one or more servers 30 over a network, with the general communication being as follows. Data that is communicated from user computer 20 includes user interface ("UI") event data that represents both successful and unsuccessful touch interactions. The data communicated to user computer 20 can include control data as well as updates to the information that is displayed on the various Smart Sign application pages.

Although a Smart Sign application user's experience resembles that of a user using a web browser, in the particular implementation, the pages are stored locally on the user computer, and the information that is downloaded to the user computer is more limited.

In a specific implementation, the application responds to successful touch interactions, and the user computer captures information about successful and unsuccessful interactions. In a specific implementation, the user computer stores the captured information in memory, and periodically (say at 15-minute intervals) writes the stored information to a file on the user computer. The particular protocols by which the user computer sends the stored data to the server is not part of the invention, but it is generally contemplated that the intervals at which data is communicated to the server will be under the control of the server.

In the course of collecting the user interaction information, the user computer preferably attempts to group consecutive events into sessions (i.e., a single user interacting with the user computer). Certain periods of inactivity typically signify a break between sessions, although some pages by their nature may hold a user for a longer time before switching, and the session can be considered to remain in effect.

The server operates to store data received from the user computer in a database 35. In the context of the user computer being a Smart Sign, there will typically be hundreds or thousands of user computers actively generating data at any given time. The data in the database is made available to an analytics processor 40, which communicates with one or more analyst computers 45. The analytics processor responds to database queries from the analyst computers, and provides UI event data matching the queries.

The present invention is not limited to any particular database format or schema. However, a representative data set for supporting embodiments of the present invention can include the data elements set forth in the following table (representative data values for some fields are shown):

| | Exemplary Event 1 | Exemplary Event 2 |
| --- | --- | --- |
| Store location | Downtown Palo Alto, CA | Downtown Montreal, QC |
| Smart Sign ID | | |
| Session ID | | |
| Time of event | Y1-M1-D1/23:34: 21.795 | Y1-M1-D1/08.43.05.351 |
| Screen position | 948, 516 | 463, 598 |

-continued

| | Exemplary Event 1 | Exemplary Event 2 |
| --- | --- | --- |
| of event | | |
| Type of event | Single tap | Long press |
| Page name | Specialist_request_made | imac21.5_compare_main_view |
| Product family | iPhone | iMac |
| Product sub-family | iPhone 4S | iMac 21.5 |

The actual mechanisms for encoding these raw data values, and organizing and optimizing the database are not a part of the invention and will not be described further. However, the type of data set forth above, however implemented, will allow queries by product, application page and sub-page, date/time range, geographical area, and the like.

It suffices, however, to note at this point that the analyst computer executes an analyst application 50, which processes the received UI event data and provides a visual representation of the UI data that can be viewed in combination with the application pages that gave rise to the underlying data. This is denoted schematically as the analyst application block labeled "Generate and Display Spatial Distributions." For example, if the analyst is interested in understanding how users interact with application pages relating to a particular product, the query would limit the data to events that occurred in connection with a user seeking information about that product. Furthermore, as will be described below, the spatial information will be displayed in connection with application pages pertaining to that product.

The UI event data that is displayed can be that from a single session. This could be, for example, a simulated playback of the session including a sequential representation of the UI events and the resulting application actions that occurred in response to the UI events. Alternatively, the UI event data that is displayed can be the result of amalgamating many sessions, and displaying a representation of the spatial density of UI events for those multiple sessions.

Figure 3:
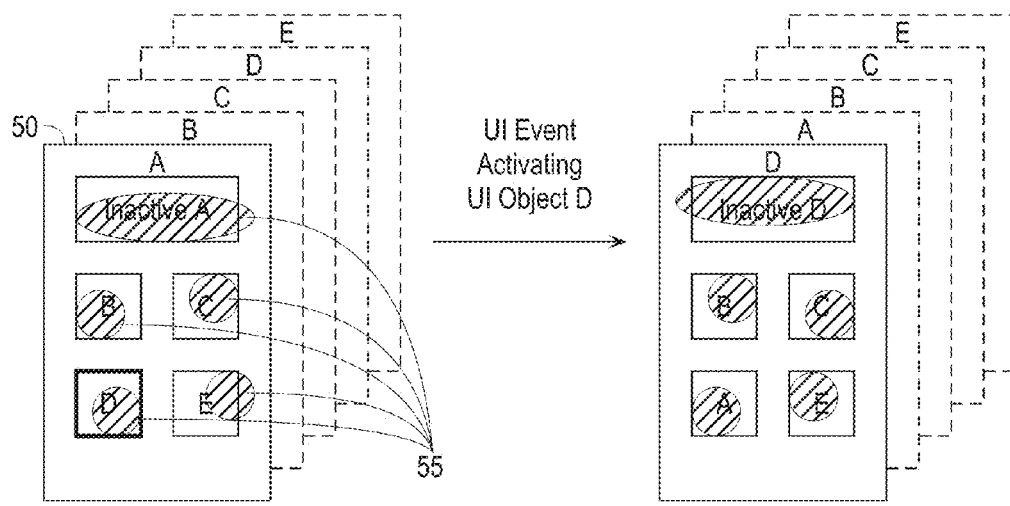
FIG. 3 is a schematic representation of an analyst application, showing elements from an application such as that shown in FIG. 1, with a heat map superimposed on the display.

While it is possible to represent the spatial density of touch events in many ways, such as scatter plots and contour lines, the preferred implementation uses a heat map where different colors are used to represent different degrees of the spatial density of UI events. For example, red, orange, yellow, green, blue, and purple can be used to represent descending ranges of spatial density. A heat map is particularly effective when there are so many events that a scatter plot or other representation would it not make it easy to discern the different density levels Displaying Spatial Distribution of Previously Logged User Interface Events Schematic View FIG. 3 is a schematic representation of an example of analyst application 50. The analyst application includes and displays elements such as those of application 10 shown in FIG. 1, but is provided with additional functionality, including the ability to generate a heat map 55 that can be superimposed on the display. Again, the representative application is shown as having five pages or screens, labeled A, B, . . . E with Page A initially being displayed on the left side of the figure. What differs from the application shown in FIG. 1 is that heat map 55, shown schematically as a set of shaded oval or circular regions, is superimposed on the application page. As shown, discrete portions of the heat map overlie the inactive and active regions, which correspond to inactive region "Inactive A," and the four active regions labeled B, C, D, and E in FIG. 1. This heat map represents how the sample of users interacted with Page A on the user computers. One fact that can be seen from this exemplary view is that users attempted to interact with the inactive region.

An optional additional feature of the system allows the analyst to interact with the application in much the same way that any user could have interacted when the application was running on one of the user computers, but with a heat map superimposed to show how a sample of users actually did interact with the displayed page of the application. For example, as was also seen in FIG. 1, a UI event in active region D on Page A causes Page D to be displayed. However, on the analyst computer, in addition to Page D's active and inactive elements, a heat map is displayed, with this heat map representing interactions that took place on Page D.

Pictorial and/or Mocked-Up Views

While FIG. 3 shows the application screens and heat maps as highly stylized elements, a specific example will now be discussed with reference to FIGS. 4A and 4B, which provide a more realistic view of an application such as that shown in FIG. 1, and a more realistic view of analyst application 50 as shown in FIG. 3 with a heat map (based on simulated data) superimposed on the display.

Figure 4A:
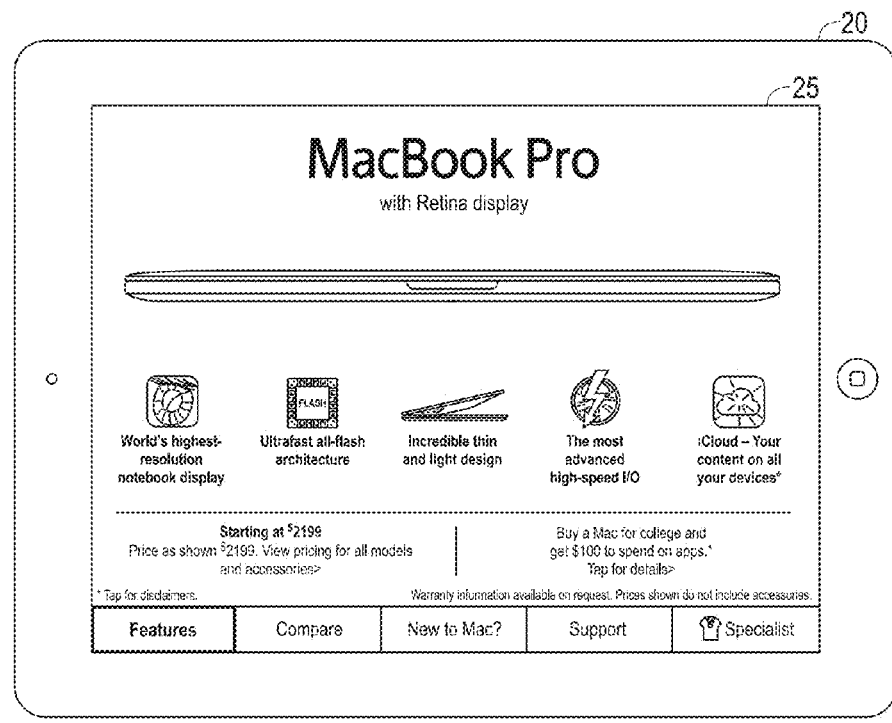
FIG. 4A depicts an image of a user computer running a user computer application.

FIG. 4A depicts an image of an iPad (one example of user computer 20) running Smart Sign application 25 with a screen providing information regarding Apple's MacBook Pro notebook computer. The upper portion of the page contains the page title (MacBook Pro with Retina Display), below which is an image of the MacBook Pro showing its slim sculptured profile. Below that are five captioned icons relating to different features of the MacBook Pro. Below the feature icons are text-based active regions dealing with pricing. At the bottom of the screen are five tabs that allow a user to switch pages. Although not explicitly shown in the figure, the captioned icons are active objects that bring up additional information on their respective features. This can be accomplished in different ways; in one implementation, the additional information is brought up as a separate superimposed window which can then be closed to return to the main screen.

Figure 4B:
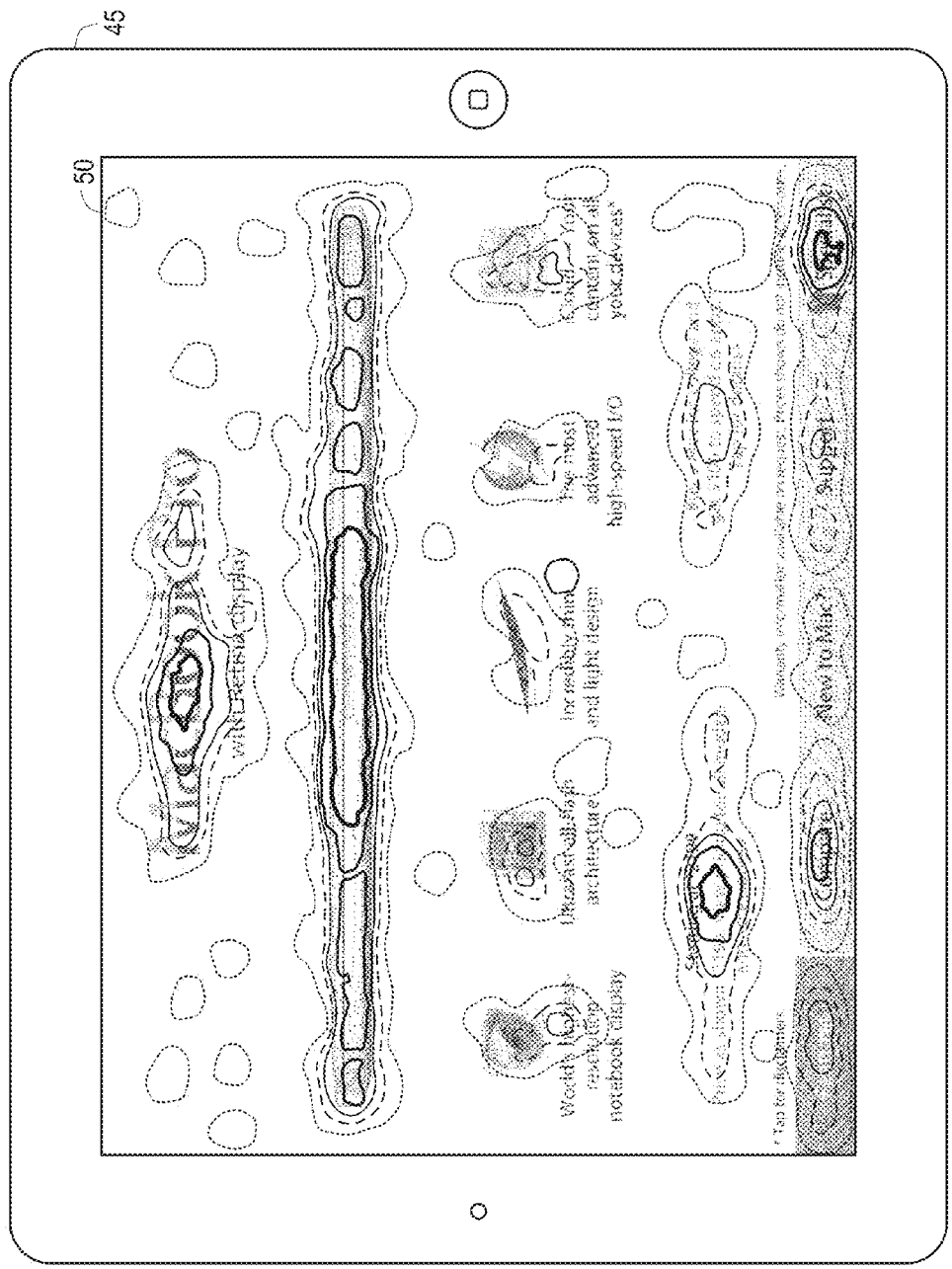
FIG. 4B is a screenshot image of an analyst computer running an analyst application with a line drawing approximately representing a heat map superimposed on the screen display shown in FIG. 4A.

FIG. 4B is a screenshot image of an iPad (one example of analyst computer 45) running an example of analyst application 50 with a line drawing approximately representing heat map 55 superimposed on the screen display shown in FIG. 4A. The heat map on which the line drawing is based includes the following colors in order of decreasing density: orange, yellow, green, light blue, and light purple. The outlines of the orange, yellow, and green regions are represented by solid lines of decreasing weight. The light blue region is represented by the coarse dashed line and the light purple region is represented by the fine dashed line. Although the outlines in FIG. 4B are provided as a graphical way to communicate the color information from the heat map that is lost by rendering in black and white, embodiments could display the outlines instead of the heat map.

Invoking Tool for Displaying Spatial Distribution of User Interface Events

Schematic View

Figure 5:
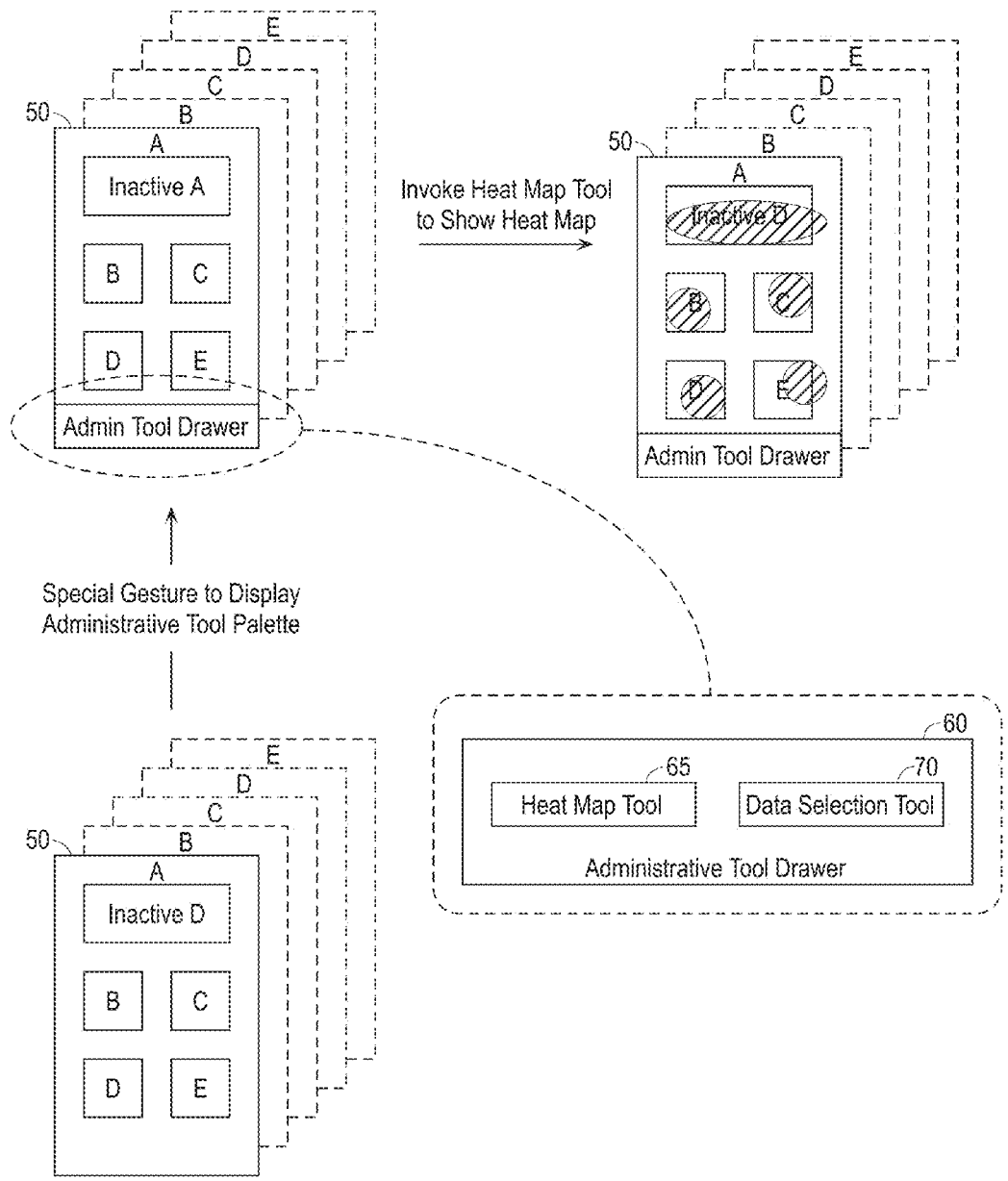
FIG. 5 is a schematic representation of how an analyst can run an analyst application to expose a tool drawer, and then can invoke a tool that results in showing the heat map or other representation of spatial density.

FIG. 5 is a schematic representation of how an analyst can run analyst application 50 to expose an administrative tool palette 60, such as a drawer, and then can invoke a tool that results in showing the heat map or other representation of spatial density. The lower left portion of the figure shows the analyst application, which includes and displays elements such as those of application 10 shown in FIG. 1, but is provided with additional functionality to support the invocation of the administrative tool palette, shown here as a drawer. As an example, a special gesture could be used. As shown in the upper left portion of the figure, the special gesture has been used and the drawer has been exposed.

In the detailed blow-up shown in the lower right portion of the figure, the tool palette is shown as having a heat map tool 65 and a data selection tool 70. The upper right portion of the figure shows the heat map tool having been invoked for the purpose of displaying a heat map (such as shown in FIG. 3). Invoking the data selection tool could, for example bring up a query screen that would allow the analyst to further limit the data.

As shown in the figure, the tool drawer remains exposed. Alternatively, the tool drawer could be caused to automatically disappear from sight as soon as a tool selection is made. This can be determined by a user setting. An alternative to a tool drawer (auto-hiding or not) is a modal pop-up tool palette, for example, invoked by a gesture. Furthermore, the tool drawer could include other tools such as a tool to allow the user to select heat map settings. In one implementation, once the heat map tool had been invoked, the tool could turn into a heat map settings tool to allow the user to interactively adjust the settings on a displayed heat map. Alternatively, or in addition, the heat map tool could turn into a tool for hiding the heat map.

Pictorial and/or Mocked-Up Views

Figure 6A:
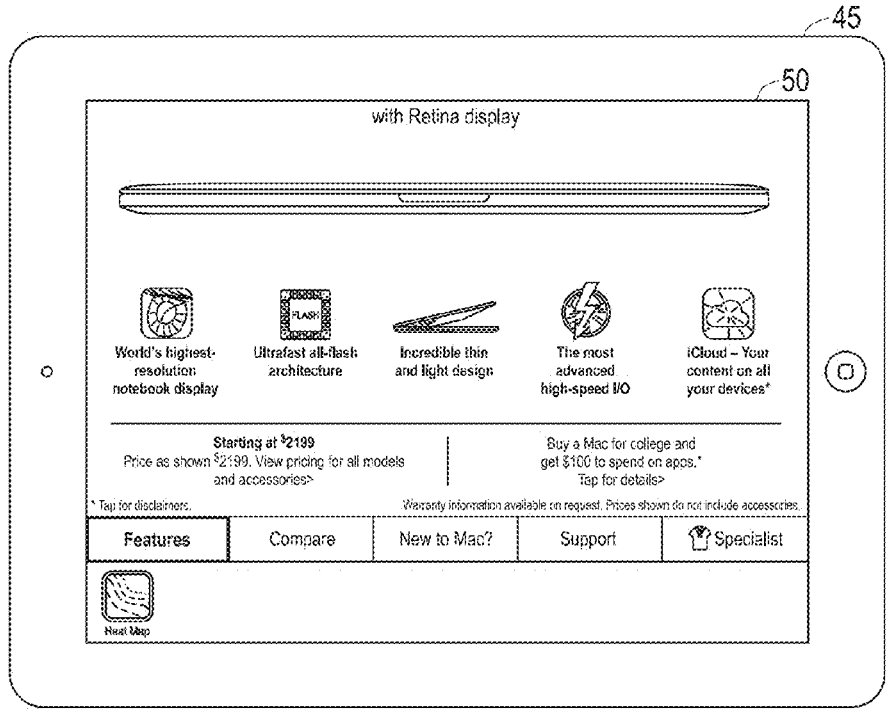
FIG. 6A provides a more realistic representation of a tool drawer.

While FIG. 5 shows the tool drawer and individual tools as highly stylized elements, more realistic examples will now be discussed. FIG. 6A provides a more realistic representation of administrative tool palette 60, implemented as a tool drawer, showing an example of heat map tool 65 at the bottom of a page substantially like the Smart Sign application page shown in FIG. 4A. Note that in this implementation, the tool drawer displaces the page elements upward.

Figure 6B:
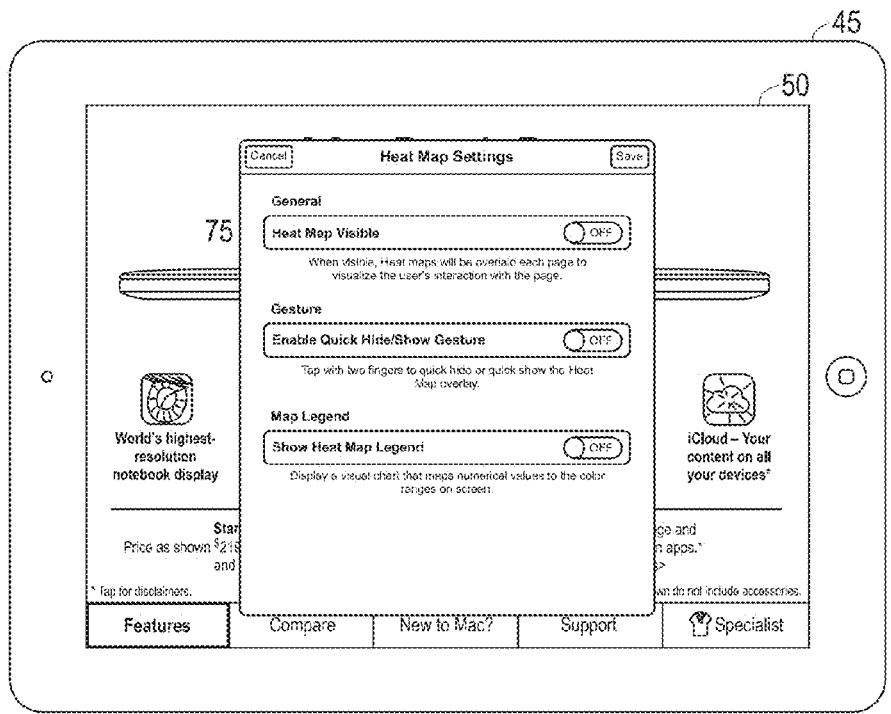
FIGS. 6B-6E show mock-ups of various modal dialog boxes for heat map settings.
Figure 6C:
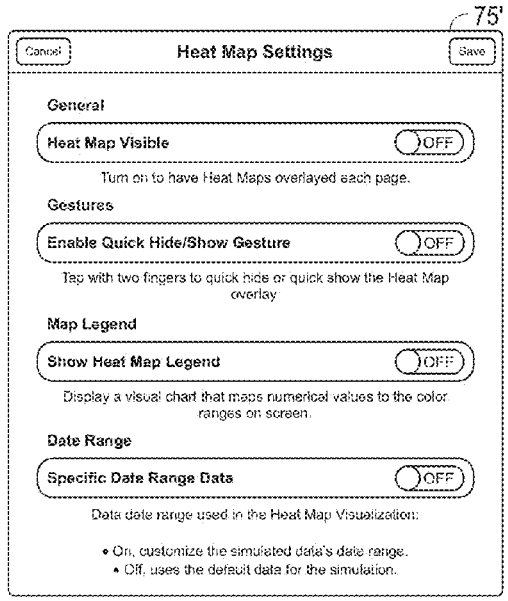
Figure 6D:
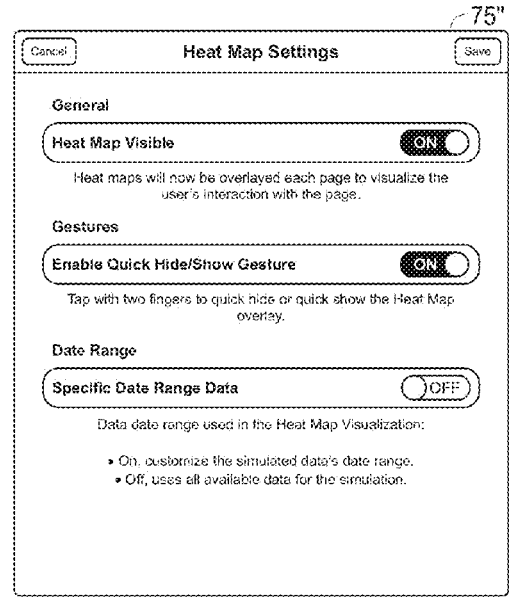
Figure 6E:
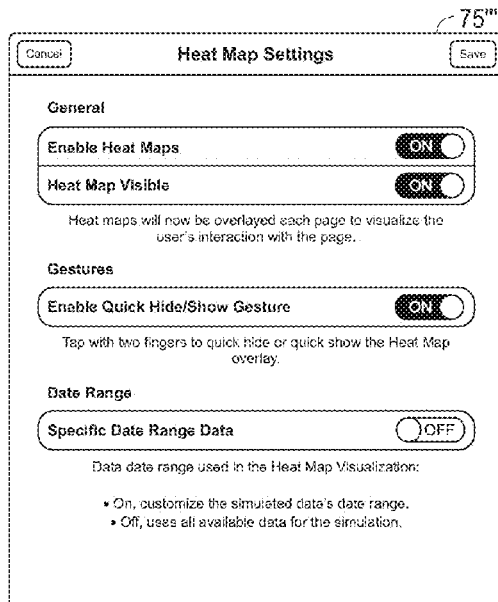
Figure 7A:
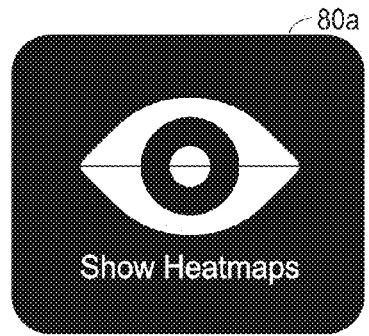
FIGS. 7A-7D show mock-ups of various tools for heat map settings and heat map control.
Figure 7B:
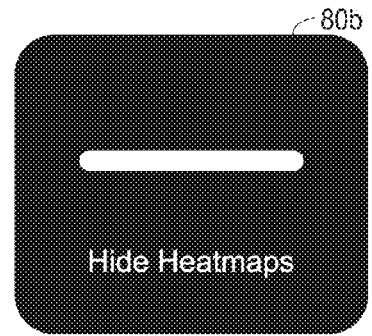
Figure 7C:
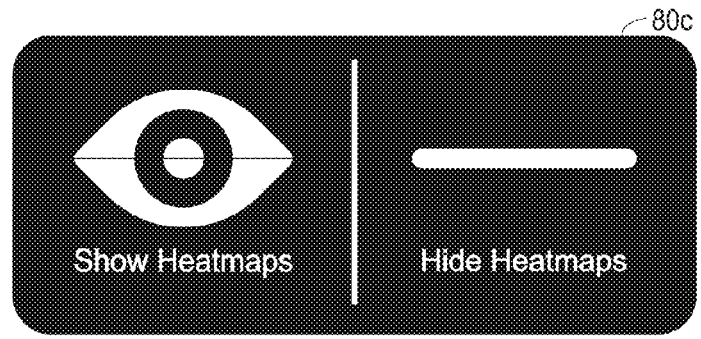
Figure 7D:
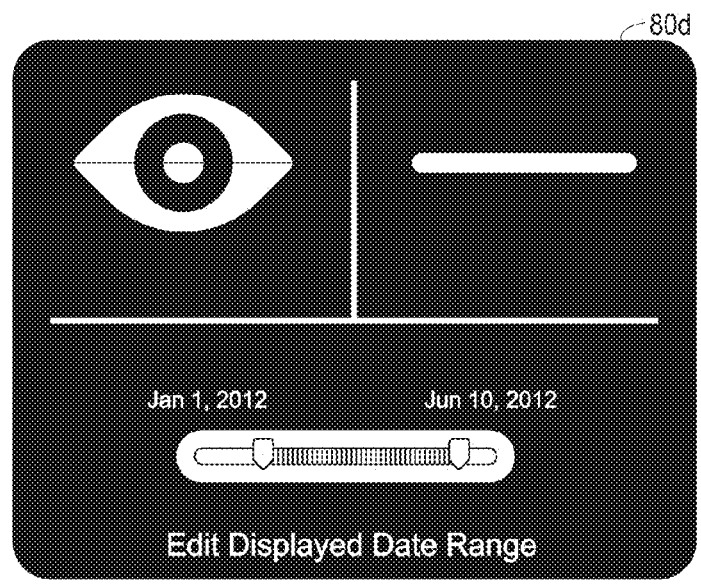

FIGS. 6B-6E show mock-ups of various administrative tool palettes implemented as modal dialog boxes that can be used for heat map settings, with FIG. 6B showing its modal dialog box 75 superimposed over the application page. FIGS. 6C-6E show just the dialog boxes, denoted 75', 75", and 75'". One of the settings shown in the dialog boxes is whether to "Enable Quick Hide/Show Gesture," i.e., whether to specify that a particular gesture (two-finger tap in the examples shown) will automatically show or hide the heat map. Another setting shown in some of the dialog boxes is whether to display a heat map legend (i.e., a chart that maps numerical ranges to the colors shown in the heat map on the screen).

FIGS. 7A-7D show mock-ups of various tools 80a-80d for heat map settings. These could be implemented in modal dialog boxes or as elements in a tool drawer. Additionally, there is no fundamental reason why any of the dialog boxes or tools couldn't be non-modal, and just sit off to the side, especially if the analyst computer has a sufficiently large display.

Representative Computer Hardware

Figure 8:
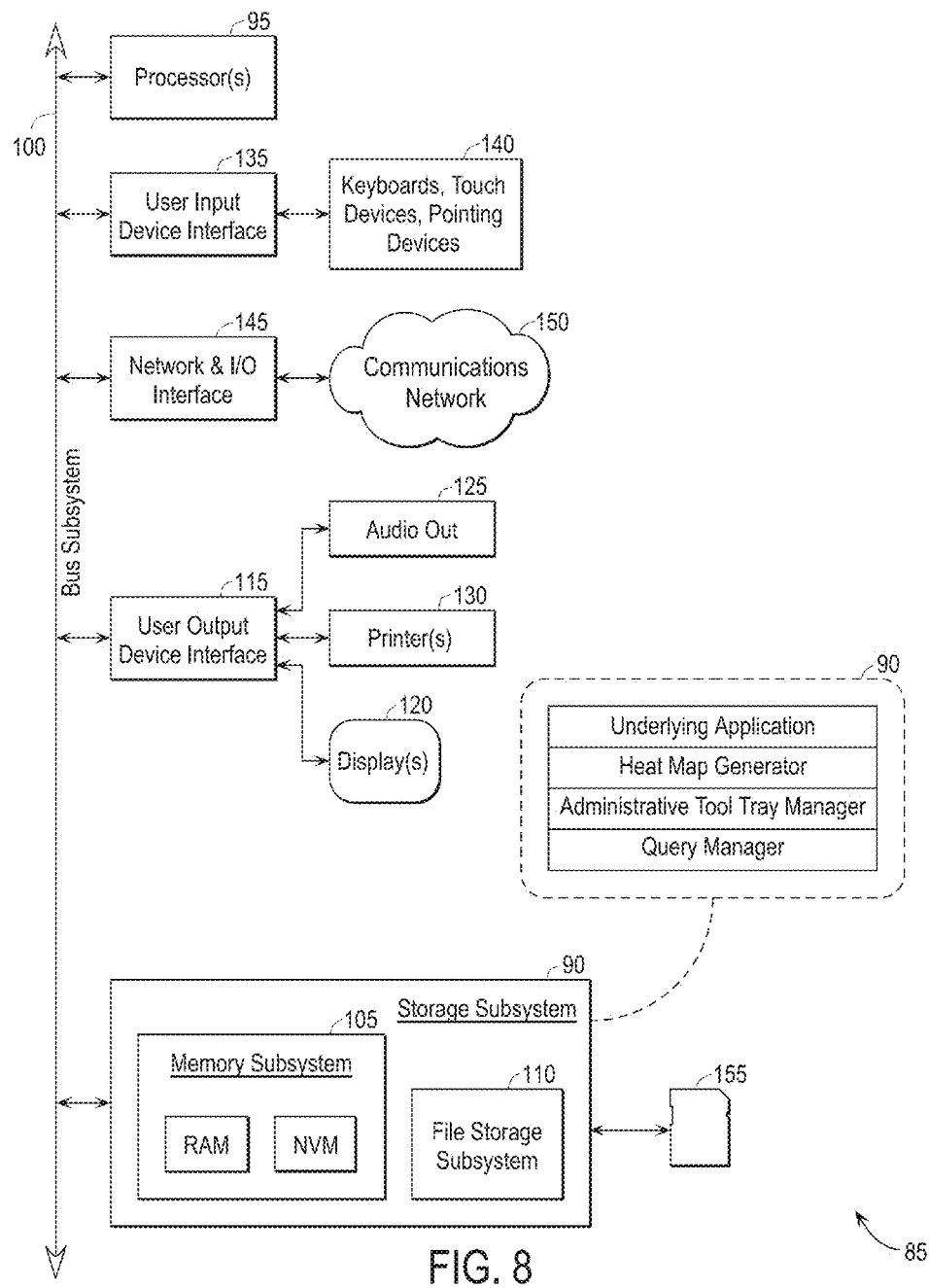
FIG. 8 is a block diagram of a computer system that could be used to implement the analyst computer shown in FIG. 1.

FIG. 8 is a block diagram of a computer 85 system that could be used to implement the analyst computer shown in FIG. 2. The system includes a storage subsystem 90, which is drawn schematically as including programming and data constructs germane to embodiments of the invention. As such, the figure is not designated as prior art. A similar computer could be used to implement the user computers, the server(s), and the analytics processor. The computer would lack the specific programming and data constructs shown in the figure, but would include others appropriate for that computer's deployment.

The computer system typically includes at least one processor 95, which can be a conventional microprocessor or microcontroller. The processor can communicate with a number of peripheral devices via a bus subsystem 100. The bus subsystem provides a mechanism for letting the various components and subsystems of the computer system to communicate with each other as intended. Although the bus subsystem is shown schematically as a single bus, embodiments of the bus subsystem may utilize multiple buses, and various of the components may have private connections. Although the specifically described embodiments of the present invention are processor-based embodiments, other embodiments can be implemented with other types of controllers such as combinatorial logic.

In addition to storage subsystem 90, which is shown as having a memory subsystem 105 and a file storage subsystem 110, the devices on the bus can include various interface controllers for interfacing to other devices or functional elements that do not interface to other devices. In the representative configuration shown in FIG. 8, the additional devices include a user output device interface 115 (shown coupled to a display 120, an audio output device 125, and a printer 130), a user input device interface 135 (shown coupled to devices 140 such as keyboards, touch devices, pointing devices), a network and I/O interface 145 (shown coupled to a communications network 150).

Embodiments of the present invention can be implemented with many different types of processor, including embedded processors such as processors using the ARM architecture (a RISC architecture designed by ARM Limited). Others can use microprocessors such as those provided by Intel or AMD.

Storage Subsystem

Storage subsystem 90 can include various types of storage media, and stores the basic programming and data constructs that provide at least some of the functionality of the computer system. For example, the various program modules and databases implementing the functionality of the system may be stored in storage subsystem 90. The software modules are generally executed by processor(s) 95.

Memory subsystem 105 typically includes a number of memories including a main random access memory (RAM) for storage of instructions and data during program execution and a non-volatile memory (NVM) in which fixed instructions and fixed system parameters are stored. While the non-volatile memory may be a ROM, rewritable non-volatile memories such as flash EPROMs may be used.

File storage subsystem 110 provides persistent (non-volatile) storage for program and data files, and may include, for example, one or more hard disk drives and/or flash memory drives. Additionally the file storage subsystem may support associated removable media 155, e.g., flash memory cards such as those used in digital cameras and mobile phones. Possible types of flash memory cards include but are not limited to Secure Digital (SD), CompactFlash (CF), Memory Stick (MS), MultiMediaCard (MMC) xD-Picture Card (xD), and SmartMedia (SM).

I/O Interface

Network and I/O interface 145 operates, for wired connections, to provide output signals and receive input signals to and from outside entities. As mentioned above, it is typically connected to a communications network such as communications network 150.

Network and I/O interface 145 may include one or more peripheral interfaces such as USB, IEEE 1394 (Firewire), and Bluetooth (a short-range wireless communication standard developed by the Bluetooth SIG and licensed under the trademark Bluetooth®). The I/O interface may also or alternatively include one or more wired networking interfaces (e.g., Ethernet) or wireless networking interfaces (e.g., Wi-Fi adhering to one of the 802.11 family standards, digital mobile phone technologies). Thus, depending on the embodiment, network and I/O interface 145 can provide an interface to one or more host computers, one or more networks, or accessories coupled to computer system 85. The I/O subsystem need not be configured for all these possibilities; it can be very limited in scope for some embodiments.

User Input and Output Devices

The user input devices coupled to user input device interface 135 may include one or more of any or all of the following: keyboards; pointing devices such as mice, trackballs, touchpads, or graphics tablets; scanners, barcode scanners; touchscreens incorporated into displays; audio input devices such as voice recognition systems, microphones, and other types of input devices. In general, use of the term "user input device" is intended to include all possible types of devices and ways for a user to input information into computer system 85.

As shown, one of the user output devices coupled to user output device interface 115 is display 120. The present invention does not rely on any particular type of display, although suitable candidates can include liquid crystal displays (LCDs) or light emitting diode (LED) displays. Some computers can also provide non-visual display such as audio output. In general, use of the term "user output device" is intended to include all possible types of devices and ways to output information from the computer to a user.

In some embodiments of the present invention, user input devices can include a touch-sensitive element overlaying the display, providing a touchscreen interface. The user could interact using a stylus or one or more fingers. This would certainly be the case if the analyst computer is based on an iPad.

CONCLUSION

In conclusion, it can be seen that embodiments of the present invention provide an elegant solution to the problem of determining how users actually interact with the software that is provided to them. The developers, armed with this data, can determine ways to improve the user experience.

While the above is a complete description of specific embodiments of the invention, the above description should not be taken as limiting the scope of the invention as defined by the claims.

What is claimed is:

1. A method, comprising:
   at a first computing device with a display, one or more processors, and memory:
   displaying, on the display, a user interface for an analyst application;
   displaying, in the user interface for the analyst application, a representation of a first user interface for a first application;
   retrieving previously stored user interface touch event data for the first user interface for the first application, wherein:
   the previously stored user interface touch event data include respective locations in the first user interface where respective touch events occurred;
   displaying, in the analyst application overlaid on the representation of the first user interface for the first application, a first spatial density distribution of touch events that corresponds to the retrieved user interface touch event data for the first user interface for the first application;

detecting activation of a representation of a first user interface element displayed in the representation of the first user interface for the first application, wherein at least a portion of the first spatial density distribution of touch event is overlaid on the representation of the first user interface element; and, in response to detecting activation of the representation of the first user interface element displayed in the representation of the first user interface for the first application, concurrently displaying, in the user interface for the analyst application:

a representation of a second user interface for the first application, and a second spatial density distribution of touch events that corresponds to the second user interface for the first application, wherein:

the second spatial density distribution of touch events is overlaid on the representation of the second user interface for the first application, the second user interface is distinct from the first user interface, and the second spatial density distribution of touch events is distinct from the first density distribution of touch events.

2. The method of claim 1, wherein the previously stored user interface touch event data includes touch event data from a plurality of computing devices with touch sensitive displays that displayed the first user interface while executing the first application.

3. The method of claim 1, wherein the first user interface includes active screen objects and inactive screen regions, the previously stored user interface touch event data includes touch events that occurred on active screen objects and touch events that occurred on inactive screen regions, and the spatial density distribution of touch events indicates touch events that occurred on active screen objects and touch events that occurred on inactive screen regions.

4. The method of claim 1, wherein:

an administrative user data analysis tool palette that provides one or more data analysis tools for analyzing the first application with the analyst application is concurrently displayed in the analyst application with the representation of the first user interface for the first application; and the administrative user data analysis tool palette includes a tool for selecting a range of dates of touch events that are included in the spatial density distribution of touch events that is overlaid on the representation of the first user interface for the first application.

5. The method of claim 1, wherein:

an administrative user data analysis tool palette that provides one or more data analysis tools for analyzing the first application with the analyst application is concurrently displayed in the analyst application with the representation of the first user interface for the first application; and the spatial density distribution of touch events is displayed in response to detecting activation of a data analysis tool in the administrative user data analysis tool palette.

6. The method of claim 1, wherein the analyst application allows for the same interactivity with the representation of the first user interface as with the first user interface in the first application.

7. A computing device, comprising:

a display;

a processor;

memory; and one or more programs, wherein the one or more programs are stored in the memory and configured to be executed by the processor, the one or more programs including instructions for:

displaying, on the display, a user interface for an analyst application;

displaying, in the user interface for the analyst application, a representation of a first user interface for a first application;

retrieving previously stored user interface touch event data for the first user interface for the first application, wherein:

the previously stored user interface touch event data include respective locations in the first user interface where respective touch events occurred;

displaying, in the analyst application overlaid on the representation of the first user interface for the first application, a first spatial density distribution of touch events that corresponds to the retrieved user interface touch event data for the first user interface for the first application;

detecting activation of a representation of a first user interface element displayed in the representation of the first user interface for the first application, wherein at least a portion of the first spatial density distribution of touch event is overlaid on the representation of the first user interface element; and, in response to detecting activation of the representation of the first user interface element displayed in the representation of the first user interface for the first application, concurrently displaying, in the user interface for the analyst application:

a representation of a second user interface for the first application, and a second spatial density distribution of touch events that corresponds to the second user interface for the first application, wherein:

the second spatial density distribution of touch events is overlaid on the representation of the second user interface for the first application, the second user interface is distinct from the first user interface, and the second spatial density distribution of touch events is distinct from the first density distribution of touch events.

8. The computing device of claim 7, wherein the previously stored user interface touch event data includes touch event data from a plurality of computing devices with touch sensitive displays that displayed the first user interface while executing the first application.

9. The computing device of claim 7, wherein the first user interface includes active screen objects and inactive screen regions, the previously stored user interface touch event data includes touch events that occurred on active screen objects and touch events that occurred on inactive screen regions, and the spatial density distribution of touch events indicates touch events that occurred on active screen objects and touch events that occurred on inactive screen regions.

10. The computing device of claim 7, wherein:

an administrative user data analysis tool palette that provides one or more data analysis tools for analyzing the first application with the analyst application is concurrently displayed in the analyst application with the representation of the first user interface for the first application; and the administrative user data analysis tool palette includes a tool for selecting a range of dates of touch events that are included in the spatial density distribution of touch events that is overlaid on the representation of the first user interface for the first application.

11. The computing device of claim 7, wherein:

an administrative user data analysis tool palette that provides one or more data analysis tools for analyzing the first application with the analyst application is concurrently displayed in the analyst application with the representation of the first user interface for the first application; and the spatial density distribution of touch events is displayed in response to detecting activation of a data analysis tool in the administrative user data analysis tool palette.

12. The computing device of claim 7, wherein the analyst application allows for the same interactivity with the representation of the first user interface as with the first user interface in the first application.

13. A non-transitory computer readable storage medium storing one or more programs, the one or more programs comprising instructions, which when executed by a first computing device with a display, cause the first computing device to:

display, on the display, a user interface for an analyst application;

display, in the user interface for the analyst application, a representation of a first user interface for a first application;

retrieve previously stored user interface touch event data for the first user interface for the first application, wherein:

the previously stored user interface touch event data include respective locations in the first user interface where respective touch events occurred;

display, in the analyst application overlaid on the representation of the first user interface for the first application, a first spatial density distribution of touch events that corresponds to the retrieved user interface touch event data for the first user interface for the first application;

detect activation of a representation of a first user interface element displayed in the representation of the first user interface for the first application, wherein at least a portion of the first spatial density distribution of touch event is overlaid on the representation of the first user interface element; and, in response to detecting activation of the representation of the first user interface element displayed in the representation of the first user interface for the first application, concurrently display, in the user interface for the analyst application:

a representation of a second user interface for the first application, and a second spatial density distribution of touch events that corresponds to the second user interface for the first application, wherein:

the second spatial density distribution of touch events is overlaid on the representation of the second user interface for the first application, the second user interface is distinct from the first user interface, and the second spatial density distribution of touch events is distinct from the first density distribution of touch events.

14. The computer-readable storage medium of claim 13, wherein the previously stored user interface touch event data includes touch event data from a plurality of computing devices with touch sensitive displays that displayed the first user interface while executing the first application.

15. The computer-readable storage medium of claim 13, wherein the first user interface includes active screen objects and inactive screen regions, the previously stored user interface touch event data includes touch events that occurred on active screen objects and touch events that occurred on inactive screen regions, and the spatial density distribution of touch events indicates touch events that occurred on active screen objects and touch events that occurred on inactive screen regions.

16. The computer-readable storage medium of claim 13, wherein:

an administrative user data analysis tool palette that provides one or more data analysis tools for analyzing the first application with the analyst application is concurrently displayed in the analyst application with the representation of the first user interface for the first application; and the administrative user data analysis tool palette includes a tool for selecting a range of dates of touch events that are included in the spatial density distribution of touch events that is overlaid on the representation of the first user interface for the first application.

17. The computer-readable storage medium of claim 13, wherein:

an administrative user data analysis tool palette that provides one or more data analysis tools for analyzing the first application with the analyst application is concurrently displayed in the analyst application with the representation of the first user interface for the first application; and the spatial density distribution of touch events is displayed in response to detecting activation of a data analysis tool in the administrative user data analysis tool palette.

18. The computer-readable storage medium of claim 13, wherein the analyst application allows for the same interactivity with the representation of the first user interface as with the first user interface in the first application.

* * * * *